United States Patent [19]

Lenzen et al.

[11] Patent Number: 4,896,898

[45] Date of Patent: Jan. 30, 1990

[54] IGNITER FOR AN INFLATABLE OCCUPANT RESTRAINT

[75] Inventors: Reiner Lenzen, Almont; Leo S. Knowlden, Romeo, both of Mich.

[73] Assignee: TRW Vehicle Safety Systems Inc., Lyndhurst, Ohio

[21] Appl. No.: 243,618

[22] Filed: Sep. 13, 1988

[51] Int. Cl.[4] .............................................. B60R 21/32
[52] U.S. Cl. .................................... 280/735; 280/736; 280/741; 102/202.8
[58] Field of Search ............... 280/728, 734, 735, 736, 280/741; 102/202.8, 275.6

[56] References Cited

U.S. PATENT DOCUMENTS

| | | | |
|---|---|---|---|
| 3,522,769 | 1/1971 | Kemmerer et al. | 280/734 |
| 3,601,081 | 8/1971 | Smith et al. | 280/734 X |
| 3,663,035 | 5/1972 | Norton | 280/734 |
| 3,754,506 | 8/1973 | Parker | 102/202.8 |
| 3,955,505 | 5/1976 | Johnston | 102/206 |
| 4,178,016 | 12/1979 | Andres et al. | 280/734 |
| 4,220,087 | 9/1980 | Posson | 102/275.6 |
| 4,272,102 | 6/1981 | Burkdoll | 280/734 X |
| 4,696,705 | 9/1987 | Hamilton | 149/21 |
| 4,706,990 | 11/1987 | Stevens | 280/734 |

FOREIGN PATENT DOCUMENTS

| | | | |
|---|---|---|---|
| 2120041 | 11/1971 | Fed. Rep. of Germany | 280/734 |
| 2755649 | 6/1978 | Fed. Rep. of Germany | 280/734 |
| 2033553 | 5/1980 | United Kingdom | 102/202.8 |

Primary Examiner—Charles A. Marmor
Assistant Examiner—Brian L. Johnson
Attorney, Agent, or Firm—Tarolli, Sundheim & Covell

[57] ABSTRACT

An igniter for use in a vehicle having gas generating material which upon ignition produces gas for inflating an inflatable occupant restraint. The igniter comprises a pyrotechnic transmission line having one end located adjacent the gas generating material. The pyrotechnic transmission line includes a housing and a plurality of pyrotechnic cords located in the housing and extending for substantially the length of the housing. A pair of electrically conductive members are located at a position spaced from the one end of the pyrotechnic transmission line. Each of the members have a portion disposed within the housing. The members are spaced apart. A spark is generated between the members to heat and thereby ignite the pyrotechnic cords in response to a sensor sensing deceleration of the vehicle at a rate above a predetermined rate of deceleration.

7 Claims, 2 Drawing Sheets

IGNITER FOR AN INFLATABLE OCCUPANT RESTRAINT

BACKGROUND OF THE INVENTION

1. Field of the Invention

The present invention relates to an igniter for igniting material and, in particular, to an igniter for igniting gas generating material in an inflatable occupant restraint system for a vehicle.

2. Description of the Prior Art

Igniters for igniting a gas generating material in an inflatable occupant restraint system for a vehicle are known. One such igniter is disclosed in U.S. Pat. No. 4,706,990. The igniter disclosed in U.S. Pat. No. 4,706,990 includes an impact sensor operatively connected with one end of a pyrotechnic transmission line. The pyrotechnic transmission line is connected at its other end to an inflator for the inflatable occupant restraint system. During a vehicle collision, the inertia of a moving mass in the impact sensor causes a firing pin to ignite an explosive primer. The explosive primer, when ignited, produces a shock wave which ignites the pyrotechnic transmission line which, in turn, ignites gas generating material in the inflator to rapidly generate gas to fill an inflatable restraint.

Another igniter for igniting gas generating material in a vehicle safety system is disclosed in U.S. Pat. No. 4,178,016. The igniter disclosed in U.S. Pat. No. 4,178,016 includes a crash sensor which provides an electrical signal to heat and ignite a primer. The primer then ignites a fuse cord which burns at a relatively high velocity toward a pyrotechnic charge to ignite the pyrotechnic charge. Gas generated by the ignition of the pyrotechnic charge drives a motor to tighten a seat belt against a vehicle occupant.

U.S. Pat. No. 3,754,506 discloses a detonator in which a loosely packed portion of explosive powder is located between an annular electrode and a central electrode. A spark is generated between the annular electrode and the central electrode to ignite the loosely packed explosive powder which, in turn, ignites an adjacent and more densely packed portion of the explosive powder.

SUMMARY OF THE INVENTION

The present invention is directed to an igniter for use in an inflatable occupant restraint system having gas generating material for inflating an inflatable restraint. The igniter, according to the present invention, is relatively inexpensive compared to known igniters used in inflatable occupant restraint systems.

The igniter of the present invention includes a pyrotechnic transmission line having one end located adjacent the gas generating material. The pyrotechnic transmission line includes a housing and a pyrotechnic cord located in the housing and extending substantially the length of the housing. A pair of electrically conductive members are located in an end of the pyrotechnic transmission line at a location spaced from the gas generating material. Each of the electrically conductive members has a portion located within the housing. The portions of the members located within the housing are spaced apart. A spark is generated between the portions of the electrically conductive members located with the housing to heat and thereby ignite the pyrotechnic cord.

In one embodiment of the present invention, one of the electrically conductive members is a metal sleeve. The pyrotechnic cord is located between the metal sleeve and the other electrically conductive member. The pyrotechnic cord is ignited by the spark in response to a sensor sensing deceleration of a vehicle at a rate above a predetermined rate of deceleration. The pyrotechnic cord burns rapidly toward the end located adjacent gas generating material to ignite the gas generating material.

In another embodiment of the present invention, the pair of electrically conductive members are located in a plane extending transversely to the longitudinal central axis of the pyrotechnic transmission line. A piezoelectric crystal generates electrical power in response to deformation of the crystal by a force applied to the crystal during a collision of the vehicle. A spark is generated between the electrically conductive members which creates heat to ignite the pyrotechnic cord.

BRIEF DESCRIPTION OF THE DRAWINGS

Further objects and features of the present invention will become apparent to those skilled in the art to which the present invention relates from reading the following specification with reference to the accompanying drawings, in which.

DESCRIPTION OF PREFERRED EMBODIMENTS

The present invention is directed to an igniter for igniting material. The uses and applications of the igniter may vary. By way of example, the present invention is embodied in an igniter for igniting gas generating material in a vehicle occupant restraint system 10.

Figure 1:
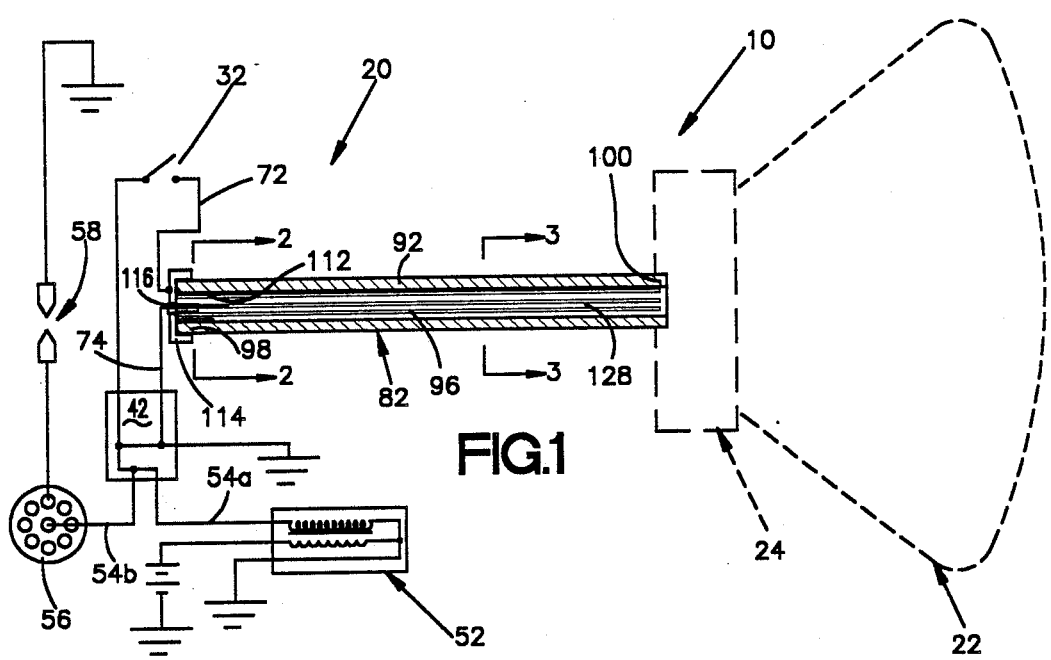
FIG. 1 is a schematic view of an inflatable occupant restraint system for a vehicle including an igniter according to one embodiment of the present invention.

The vehicle occupant restraint system 10 is illustrated in FIG. 1. The system 10 includes an inflatable occupant restraint or "airbag" 22 which expands, as is illustrated in FIG. 1, from a collapsed condition by gas that flows rapidly from an inflator 24 when the vehicle is involved in a collision of a predetermined magnitude. When the airbag 22 expands, it restrains movement of a vehicle occupant and prevents the occupant from impacting against parts of the vehicle interior, as is known.

Figure 4:
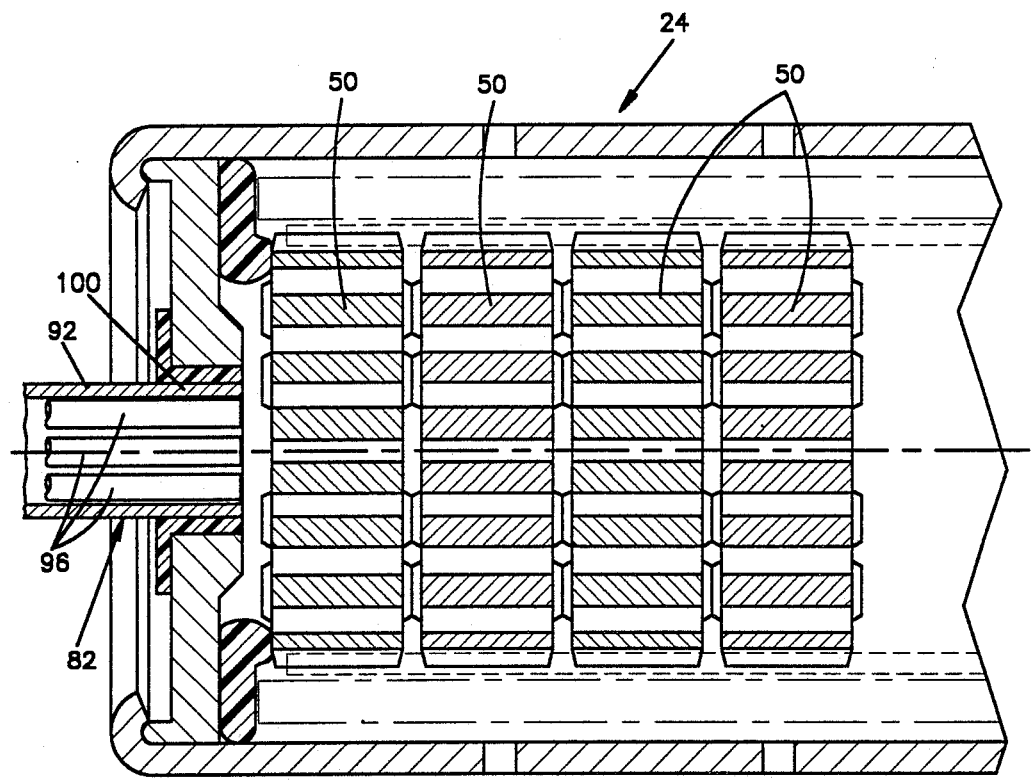
FIG. 4 is an enlarged sectional view of a portion of the occupant restraint system of FIG. 1.

When the vehicle is involved in a collision, a known inertia sensor (not shown) closes a normally open switch 32. The switch 32 is connected in series between a high voltage power source, such as an ignition coil 52 for the engine of the vehicle, and an igniter 20 for the inflatable occupant restraint system 10. When the switch 32 is closed, an electrical circuit between the coil 52 and the igniter 20 is completed to fire the igniter. Hot gases and flame from the igniter 20 ignite gas generating grains 50 (FIG. 4) located in the inflator 24. The gas generating grains 50 are preferably made of an alkali metal azide compound as disclosed in U.S. Pat. No. 4,696,705.

The coil 52 is connected through high voltage output lines 54a, 54b to an ignition distributor 56 which distributes electrical power to a plurality of spark plugs 58 for the engine of the vehicle. Only one spark plug 58 is illustrated in FIG. 1. The coil 52 is also connected to the battery 60 of the vehicle. When the switch 32 closes during a collision of the vehicle, electrical power from the ignition coil 52 is diverted to the igniter 20. It will be apparent that operation of the ignition system of the vehicle is not interferred with until the switch 32 is closed during a collision. While the igniter 20 is illustrated as being connected with the ignition coil 52, other sources of electrical energy may be used which can provide at least 5,000 volts.

The igniter 20 is connected to two electrically conductive leads 72, 74 which are connected to the switch 32 and to ground, respectively. The igniter 20 includes a pyrotechnic transmission line 82 in the form of a linear ignition material available from Explosive Technology in Fairfield, Calif. and known as ITLX. The pyrotechnic transmission line 82 may be of any suitable length as required for a specific vehicle application, such as a few inches to several feet.

Figures 2, 3:
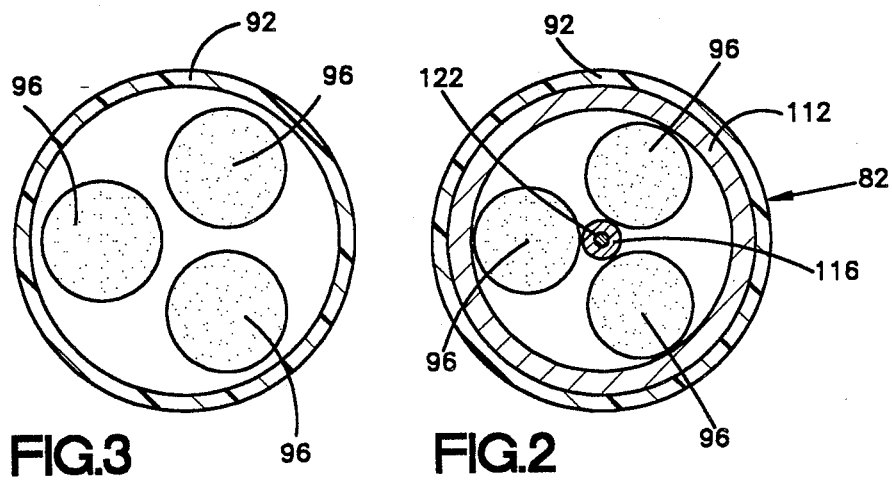
FIG. 2 is a sectional view of a portion of the igniter of FIG. 1, taken approximately along line 2—2 in FIG. 1.
FIG. 3 is a sectional view of another portion of the igniter of FIG. 1, taken approximately along line 3—3 in FIG. 1.

The pyrotechnic transmission line 82 has one end 98 connected to the leads 72, 74 and another end 100 located adjacent the gas generating grains 50 in the inflator 24. The pyrotechnic transmission line 82 includes a housing 92 (FIGS. 2–4) which is a flexible plastic tube. A plurality of pyrotechnic cords 96 are located within the housing 92 and extend for substantially the length of the housing 92.

A sleeve 112 (FIG. 2) is inserted into the housing 92 at the end 98 and is located between the housing 92 and the pyrotechnic cords 96. The sleeve 112 is preferably an electrically conductive metal tube having an axial extent into the housing 92 of about one-half inch (0.5"). An electrode 122 is located coaxially within the sleeve 112. The pyrotechnic cords 96 are arranged in a radial array between the sleeve 112 and the electrode 122. A cap 114 is fixed over the end 98 of the pyrotechnic transmission line 82. An insulator 116 supports the electrode 122 and is located within the cap 114 to electrically insulate the electrode 122 from the sleeve 112 and cap 114. The electrode 122 is connected to the lead 74 which is grounded. The sleeve 112 is connected to the lead 72 extending from the switch 32.

When the switch 32 closes during a collision, electrical power is conducted from the ignition coil 52 and a spark is generated between the sleeve 112 and the electrode 122. The heat created by the spark ignites the pyrotechnic cords 96 at the end 98. The pyrotechnic cords 96 then burn rapidly toward the end 100 of the pyrotechnic transmission line 82 to ignite the gas generating grains 50. When ignited, the pyrotechnic cords 96 burn or deflagrate and then increase in burning rate to establish a detonation/deflagration wave front which travels quickly toward the inflator 24.

From the time the switch 32 closes, initial ignition of the cords 96 preferably occurs within 1 millisecond. When the detonation/deflagration wave front reaches the inflator 24, hot gases and flame from the pyrotechnic transmission line 82 ignite the grains 50 of the gas generating material, which generate gas to inflate the airbag 22. After ignition of the pyrotechnic cords 96 is initiated, the time before the grains 50 ignite is dependent on the length of the pyrotechnic transmission line 82. Preferably, complete ignition of the pyrotechnic cords 96 occurs within 5 milliseconds. This is a different technique for igniting linear ignition material using heat only from a spark as compared to present methods. Present methods of igniting linear ignition material require an explosive squib which produces heat and pressure.

Figure 5:
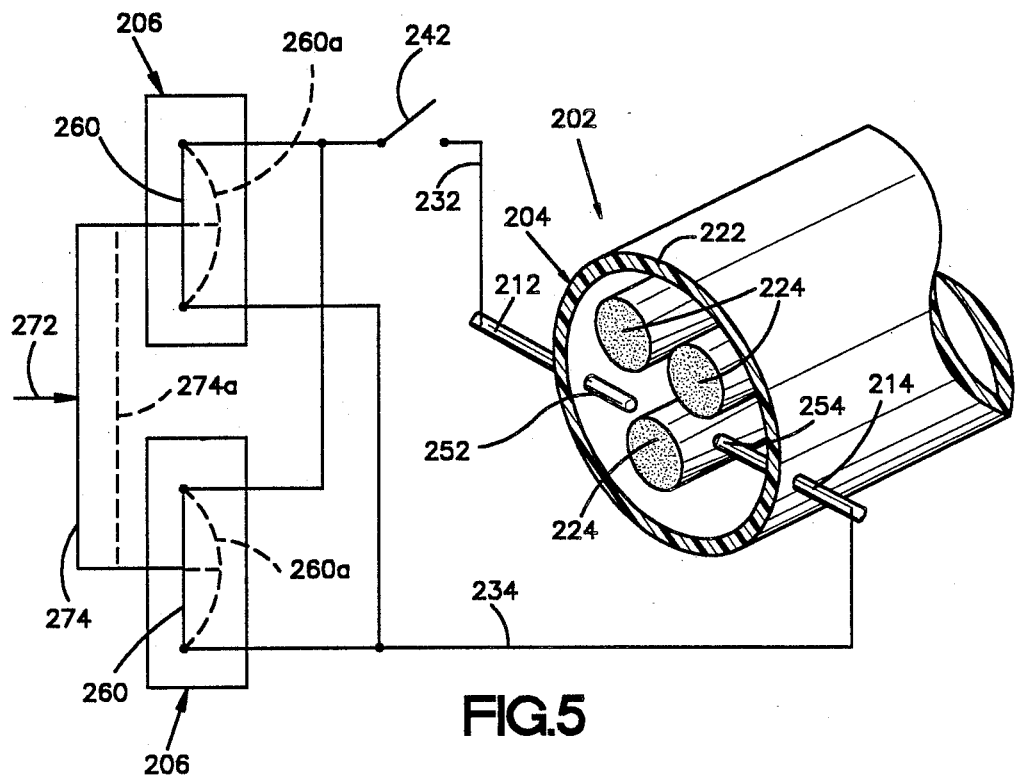
FIG. 5 is a schematic view illustrating another embodiment of the present invention.

An igniter 202, according to another embodiment of the present invention, is illustrated in FIG. 5. The igniter 202 includes linear pyrotechnic transmission line 204 which is connected at one end to an inflator (not shown) for an inflatable occupant restraint and at its other end to a pair of electrical power sources 206. The power sources 206 are connected in parallel for redundancy. The pyrotechnic transmission line 204 is similar in structure to the pyrotechnic transmission line 82 described above. The pyrotechnic transmission line 204 includes a housing 222 and pyrotechnic cords 224 located within the housing which extend for substantially the length of the housing.

A pair of elongate rod-like electrically conductive members or electrodes 212, 214 are inserted into the pyrotechnic transmission line 204 at an end portion located away from the inflator. The electrodes 212, 214 are located in a plane extending perpendicular to the longitudinal central axis of a portion of the pyrotechnic transmission line 204 located adjacent the electrodes. Respective ends 252, 254 of the electrodes are located adjacent one another but are spaced apart. The electrodes 212, 214 are fixed in any suitable manner, such as by adhesive bonding or the like, to the pyrotechnic transmission line 204 so that the ends 252, 254 are maintained in the spaced apart relationship. Wires 232, 234 connect the respective electrodes 212, 214 with the pair of power sources 206.

When the vehicle is involved in a collision, a known inertia sensor (not shown) closes switch 242 and electrical power from the power sources 206 is conducted to the electrodes 212, 214 to generate a spark between the ends 252, 254 of the electrodes. The heat created by the spark between the ends 252, 254 of the electrodes 212, 214 ignites the pyrotechnic cords 224. The pyrotechnic cords 224 then burn rapidly toward the end of the pyrotechnic transmission line 204 connected with the inflator, as described above, to ignite grains of gas generating material located in the inflator.

Each power source 206 includes a known piezoelectric crystal 260. Upon the application of a force to the piezoelectric crystal 260, such as would occur during a collision of the vehicle, the piezoelectric crystal undergoes deformation to the position indicated schematically by the dashed lines 260a. During the deformation of the piezoelectric crystal 260, an electrostatic charge is generated. When the switch 242 is closed, the electrostatic charge creates a spark between the ends 252, 254 of the electrodes 212, 214 to ignite the pyrotechnic cords 224.

A force, as indicated by the arrow 272, is applied to the piezoelectric crystals 260 in order to deform the piezoelectric crystals and generate the electrostatic charge. The force 272 may be transmitted through a front bumper 274 of the vehicle, for example, as illustrated schematically in FIG. 5. The front bumper 274 is mechanically connected with the piezoelectric crystals 260. During a collision in the vehicle head-on direction, the front bumper 274 moves to the position illustrated in dashed lines 274a to deform the piezoelectric crystals 260 to the position indicated by dashed lines 260a. However, it will be apparent that other mechanical means for deforming the piezoelectric crystals 260 can be used.

The use of the piezoelectric crystals 260 to generate electrical power provides an advantage in that a power source 206 independent of the vehicle electrical system is provided. Thus, when the electrical system of the vehicle is not operating, electrical power is provided to ignite the igniter 202.

From the above description of embodiments of the invention, those skilled in the art will perceive improvements, changes and modifications. Such improvements, changes and modifications within the skill of the art are intended to be covered by the appended claims.

Having described specific preferred embodiments of the invention, we claim:

1. An apparatus for igniting material, said apparatus comprising:

a pyrotechnic transmission line having one end located adjacent the material, said pyrotechnic transmission line including a housing and a plurality of pyrotechnic cords located in said housing and extending for substantially the length of said housing, said plurality of pyrotechnic cords igniting upon the application of heat thereto;

a pair of electrically conductive members located at a position spaced from said one end of said pyrotechnic transmission line, each of said members having a portion located within said housing, said portions of said members being spaced apart and said plurality of pyrotechnic cords being located between said members; and means for generating a spark between said pair of members to heat and thereby ignite said plurality of pyrotechnic cords, said means for generating a spark including an actuatable electric switch and a power source operatively connected with said pair of members to generate the spark between said pair of members in response to actuation of said switch, said power source comprising a coil of a spark ignition system for an internal combustion engine.

2. The apparatus set forth in claim 1 wherein one of said pair of members comprises a tubular metal sleeve located coaxially in said housing and the other of said pair of members is located coaxially within said sleeve.

3. The apparatus set forth in claim 1 wherein said housing comprises a flexible tubular member and said plurality of pyrotechnic cords burns by deflagration upon ignition and at a rate that increases as said plurality of pyrotechnic cords burn.

4. An apparatus for use in a vehicle having gas generating material which upon ignition produces gas for inflating an inflatable occupant restraint, said apparatus comprising:

a pyrotechnic transmission line having one end located adjacent the gas generating material, said pyrotechnic transmission line including a housing and a plurality of pyrotechnic cords located in said housing and extending for substantially the length of said housing, said plurality of pyrotechnic cords igniting upon the application of heat thereto;

a pair of electrically conductive members located at a position spaced from said one end of said pyrotechnic transmission line, each of said members having a portion located within said housing, said portions of said members being spaced apart and said plurality of pyrotechnic cords being located between said members; and means for generating a spark between said members to heat and thereby ignite said plurality of pyrotechnic cords;

said generating means including an electrical switch responsive to vehicle deceleration and a power supply electrically connected with said members to generate the spark between said members in response to said switch being actuated by deceleration of the vehicle at a rate above a predetermined rate of deceleration, said power supply comprising a coil for a spark ignition system for an engine of the vehicle.

5. The apparatus set forth in claim 4 wherein one of said members is a tubular metal sleeve and wherein the other of said members is an electrode located coaxially relative to said sleeve and further including an insulator disposed around a portion of said electrode for electrically insulating said electrode from said sleeve.

6. An apparatus for igniting material, said apparatus comprising:

a pyrotechnic transmission line having one end located adjacent the material, said pyrotechnic transmission line including a housing and a plurality of pyrotechnic cords located in said housing and extending for substantially the length of said housing, said plurality of pyrotechnic cords igniting upon the application of heat thereto;

an electrically conductive member located at a position spaced from said one end of said pyrotechnic transmission line and within said housing;

an electrode located within said pyrotechnic transmission line at a position spaced from said one end of said pyrotechnic transmission line and spaced from said electrically conductive member and said plurality of pyrotechnic cords being located between said electrically conductive member and said electrode; and means for generating a spark between said electrode and said electrically conductive member to ignite said plurality of pyrotechnic cords;

said means for generating a spark including an actuatable electric switch and a power source operatively connected with said electrode and said member to generate the spark between said electrode and said member in response to actuation of said switch, said power source comprising a coil of a spark ignition system for an internal combustion engine.

7. The apparatus set forth in claim 6 wherein said electrically conductive member comprises a tubular metal sleeve located coaxially in said housing and said electrode is located coaxially within said sleeve and further including an insulator disposed around said electrode for electrically insulating said electrode from said sleeve.

* * * * *